(12) United States Patent
Dirkes (10) Patent No.: US 11,761,531 B2
(45) Date of Patent: Sep. 19, 2023

(54) FILTER SYSTEM FOR A WIND TURBINE, A WIND TURBINE HAVING A FILTER SYSTEM AND METHOD FOR CHANGING AN OIL FILTER OF A FILTER SYSTEM

(71) Applicant: General Electric Renovables Espana, S.L., Barcelona (ES)

(72) Inventor: Manuel Dirkes, Salzbergen (DE)

(73) Assignee: General Electric Renovables Espana, S.L., Barcelona (ES)

( * ) Notice: Subject to any disclaimer, the term of this patent is extended or adjusted under 35 U.S.C. 154(b) by 125 days.

(21) Appl. No.: 17/239,201

(22) Filed: Apr. 23, 2021

(65) Prior Publication Data

US 2021/0332878 A1 Oct. 28, 2021

(30) Foreign Application Priority Data

Apr. 24, 2020 (EP) .................................... 20171381

(51) Int. Cl.
*F16H 57/04* (2010.01)
*F03D 15/00* (2016.01)
(Continued)

(52) U.S. Cl.
CPC ....... *F16H 57/0404* (2013.01); *B01D 35/005* (2013.01); *F03D 15/00* (2016.05);
(Continued)

(58) Field of Classification Search
CPC ............. F16H 57/0404; F16H 57/0434; F16H 57/0441; B01D 35/005; B01D 2201/202;
(Continued)

(56) References Cited

U.S. PATENT DOCUMENTS

| 8,869,940 | B2 | 10/2014 | Johnson et al. |
| 2013/0075320 | A1* | 3/2013 | Carew ................... A01K 63/045 |
| | | | 210/295 |
| 2016/0010797 | A1* | 1/2016 | Jensen .................... F16N 39/06 |
| | | | 210/167.01 |

FOREIGN PATENT DOCUMENTS

| CN | 107355531 A | 11/2017 |
| WO | WO 00/18488 | 4/2000 |
| WO | WO2018/067437 A1 | 4/2018 |

OTHER PUBLICATIONS

European Search Report Corresponding to EP20171381.5 dated Sep. 25, 2020.

(Continued)

*Primary Examiner* — Madeline Gonzalez
(74) *Attorney, Agent, or Firm* — Dority & Manning, P.A.

(57) ABSTRACT

The present disclosure is directed to a filter system for a wind turbine, comprising at least a filter device having a filter housing with a volume portion and a cap portion, both defining a filter volume for receiving the oil filter. The filter housing is equipped with an inlet port, an outlet port and a pressure port. The filter system further comprises a pressurizing device having an interface port, and supply means for providing pressurized gas via the interface port, preferably into the filter housing of the filter device. The pressurizing device is configured for being connectable to the pressure port, preferably via a compensation duct. Furthermore, a method is disclosed, wherein the pressurizing device is connected to the filter housing, lubricant is discharged by applying pressurized gas into the filter volume, the cap portion is removed and an oil filter is subsequently replaced.

12 Claims, 5 Drawing Sheets (51) Int. Cl.
*B01D 35/00* (2006.01)
*F03D 80/50* (2016.01)

(52) U.S. Cl.
CPC ........ *F03D 80/50* (2016.05); *B01D 2201/202* (2013.01); *B01D 2201/301* (2013.01)

(58) Field of Classification Search
CPC .............. B01D 2201/301; B01D 35/30; B01D 2201/167; B01D 2201/282; B01D 2201/302; B01D 2201/342; B01D 29/96; F03D 15/00; F03D 80/50; F03D 80/70
USPC ........... 210/108, 117, 136, 275, 333.01, 393, 210/411, 167.08, 455, 450, 493.2, 167.01, 210/167.02, 416.1, 416.5
See application file for complete search history.

(56) References Cited

OTHER PUBLICATIONS

EP Communication for EP application No. 20171381.5, dated Feb. 20, 2023, 7 pages.

\* cited by examiner

FILTER SYSTEM FOR A WIND TURBINE, A WIND TURBINE HAVING A FILTER SYSTEM AND METHOD FOR CHANGING AN OIL FILTER OF A FILTER SYSTEM

FIELD

The present subject matter relates generally to wind turbines, and more particularly to a filter system for a gearbox of the wind turbine, specifically a filter system for changing an oil filter of the gearbox. Furthermore, a method for changing an oil filter is described.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy into electrical energy that may be deployed to a utility grid.

Specifically, wind turbines comprise various mechanical components having parts in motion supported by motionless structures. This causes friction phenomena between said parts, wherein lubrication systems are installed to prevent or to reduce friction-related wear.

A specific type of wind turbines, for example the Danish model, include a gearbox for changing a slow rotational movement having a high torque into a relatively fast rotation with a reduced torque. For example, said gearbox can be embodied as a planetary gearbox, optionally having an additional gear stage, wherein a plurality of components of the gearbox are subject to liquid lubrication, for example oil lubrication.

For this purpose, pressurized lubricant is supplied to a variety of lubrication locations, preferably via a lubrication cycle which includes an oil filter.

However, oil filters need to be replaced on frequent basis causing downtime of the wind turbine and further related disadvantages.

BRIEF DESCRIPTION

Aspects and advantages of the invention will be set forth in part in the following description, or may be obvious from the description, or may be learned through practice of the invention.

In one aspect, the present disclosure is directed to a filter system for a wind turbine. Specifically, the filter system is configured for enabling a change of an oil filter of a filter device of the wind turbine. Possibly, the filter device is arranged in a lubrication cycle for providing lubricant to a gearbox system of the wind turbine. The term "oil filter" reflects filter means for filtering particles from a lubricant and is not restricted to filter exclusively oil.

The filter system comprises at least a filter device having a filter housing with a volume portion and a cap portion, both defining a filter volume for receiving the oil filter. The filter housing is equipped with an inlet port, an outlet port and a pressure port. Particularly, the inlet port can be connected to an upstream duct of a lubrication cycle of the gearbox system, the outlet port can be connected to a downstream duct of the lubrication cycle, wherein the pressure port is configured to allow a compensation of surplus or needed fluids from or into the filter volume.

For example, the pressure port can be connected via a compensation duct to a specific volume within the lubrication cycle, preferably to a gearbox volume of the gearbox for allowing a compensation of pressure and/or volume between the filter volume and the specific volume.

For example, in case of thermal expansion or shrinking a pressure gradient can be present between the filter volume and the gearbox volume. This pressure difference can be equalized between both volumes via the pressure port and the compensation duct.

Preferably, any component of the connection between the filter volume and volume of the lubrication cycle may be configured such, that a gaseous fluid such as air may pass between the volumes, in contrast wherein liquid lubricant, in particular due to its viscosity, can only travel through the compensation duct in a limited manner or is completely prevented from doing so. In other words, the compensation duct and/or the pressure port comprise restriction means configured for effectively preventing a liquid fluid to pass, in particular wherein a gaseous fluid may effectively flow through the compensation duct and/or pressure port. In particular, the term "is effectively prevented to pass" reflects the fact if a volumetric flow of a liquid fluid according to DIN 51517, at an absolute pressure gradient of 1 bar, a volumetric flow rate is less than 10 ml/s. For example, the compensation duct, the pressure port and/or a further component of the connection between the filter volume and the gearbox volume may have an effective it diameter of less than 5 mm, preferably less than 3 mm, more preferred less than 2 mm.

The filter system further comprises a pressurizing device having an interface port, and supply means for providing pressurized gas via the interface port, preferably into the filter housing of the filter device. The pressurizing device is configured for being connectable to the pressure port, preferably via the compensation duct. Hence, for connecting the pressurizing device with the filter volume, the compensation duct can be disconnected from the gearbox volume and attached to the interface port.

According to an optional embodiment, the supply means can be a source of pressurized gas, for example a compressor, or in the alternative a gas cartridge containing a pressurized gas like carbon dioxide or nitrous oxide.

According to an additional and/or an alternative embodiment, the pressurizing device is either firmly connected to the filter device or it even is an integral component of the filter device. In this case, the filter device comprises the pressurizing device in form of an integral component, wherein the pressure port of the filter device and the interface part of the pressurizing device are merged together and thereby enabling a connection of the pressurizing device and the filter volume. According to this alternative, but not necessarily, an additional pressure port for enabling a compensating connection between the filter volume and a volume of the lubrication cycle may be provided.

According to an embodiment, the filter system is configured for providing lubrication to a gearbox of the wind turbine, wherein the filter volume is at least 5 l, in particular at least 10 l, preferred at least 15 l, and/or, wherein the gearbox is a gearbox of the wind turbine having rated power of at least 0.5 MW, in particular of at least 1.5 MW, preferably of at least 2 MW.

The system according to an embodiment as described provides a remarkable benefit with regard to maintenance investment, downtime and sustainability. For example, by connecting the pressurizing device to the filter volume the filter volume can be emptied from lubricant by pressing the lubricant being present within the filter volume out of the filter volume into the lubrication cycle. When the oil filter has been replaced by a new oil filter, lubricant from the lubrication cycle may re-enter the filter volume.

The present disclosure provides the benefit that firstly it is avoided to empty the filter volume when changing the oil filter by spilling lubricant from the filter volume into an external receptacle (e.g. bucket, canister). This leads to handling and ergonomic benefits, and therefore to a reduction of maintenance time, for example by preventing accidents while handling the external lubricant receptacle. Secondly, lubricant being present in the filter volume does need to be disposed. In particular, it is not required to transport the external receptacle filled with lubricant from a nacelle of the wind turbine down the tower for a safe disposal thereof. Thirdly, no new lubricant needs to be refilled into the lubrication cycle of the filter system after conducting an exchange of an oil filter.

In the event, that the filter device comprises more than one pressure port, for example a first pressure port being connectable to the gearbox volume for allowing a pressure compensation between the filter volume and another volume of the lubrication cycle, and a second pressure port for enabling a connection of the filter volume with the pressurizing device, the latter, second pressure port is to be understood as functional pressure port for providing pressure into the filter volume. In this case, the first pressure port would be required to be closed. Therefore, an embodiment of a filter system having a plurality of pressurizing and/or compensating ports shall still be considered as an embodiment having a single pressurizing port, wherein a further pressurizing or compensating port is used to be connected to a volume of the lubrication cycle.

According to an embodiment, the filter system comprises at least a downstream restriction device configured for allowing lubricant to flow from the filter volume towards or into the downstream duct and for preventing lubricant from re-entering the filter volume from the downstream duct back into the filter volume via the outlet port. According to a specific embodiment, the downstream restriction device is a check valve, for example being located between the outlet port and the downstream duct.

According to a further embodiment, an upstream restriction device is provided, which is arranged and configured such, that if required no lubricant may substantially enter the filter volume and/or the filter device via the inlet port. For example, the upstream restriction device can be opened or closed, wherein the upstream restriction device shall be closed when lubricant is pressed out of the filter volume and/or when an exchange of the oil filter is effectively in progress. According to a specific aspect, the upstream restriction device can be functionally realized by a specific upstream valve and/or by a pump of the lubrication cycle.

According to an exemplary aspect, the volume portion of the filter housing is formed by a longitudinal encompassing part and a bottom part, wherein preferably the encompassing part has a cylindrical shape, and wherein the bottom part is connected to a bottom side of the encompassing part. The outlet port is arranged in the bottom part, for example centrally in the bottom part, and/or wherein the inlet port is arranged in the encompassing part. For example, the volume portion may be formed as a cylinder closed on one side by the bottom part, wherein the inlet port goes through cylindrical sidewalls of the encompassing part.

The cap portion can be attached to a topside of the volume portion while sealing off the filter volume from the environment. For this purpose, mounting means and sealing means can be provided between the cap portion and the volume portion, for example in form of a thread and/or sealing lips.

Aforementioned embodiments come with the benefit that the filter housing forming the filter volume is configured for receiving an oil filter by opening the filter housing via detaching the cap portion from the volume portion, while the flow of lubricant through such oil filter is enabled by the inlet port and the outlet port.

According to a further development, the pressure port is arranged in the cap portion. This helps to smoothen the process of pushing lubricant out of the filter volume into the outlet port.

Alternatively, the pressure port is placed in the encompassing part of the volume portion, preferably in the top side.

According to a more specific—non-limiting—embodiment, the filter system comprises an oil filter which is arranged within the filter housing. The cap portion is mounted to the volume portion. The oil filter itself has a cylindrical-similar shape including an upper surface and a bottom surface. Upper sealing means are effectively arranged between the upper surface and an inner surface of the cap portion, and wherein bottom sealing means are arranged between the bottom surface and an inner surface of the bottom part.

Specifically, the filter housing, the oil filter, the bottom sealing means and the top sealing means and respective surfaces are designed and configured such, that the filter volume is separated by the oil filter into an inlet volume and an outlet volume. The inlet volume is connected to the inlet port, wherein the outlet volume is connected to the outlet port. Consequently, lubricant when entering the inlet port arrives in the inlet volume. Subsequently, the lubricant may pass through the oil filter from the inlet volume into the outlet volume, wherein bypassing the oil filter is not possible due to the sealing means effectively arranged at related surfaces.

In the course of a further development it is disclosed, that the pressure port is, preferably exclusively, connected to the inlet volume. By this it is achieved that lubricant being pressed out of the filter volume is forced to flow through the oil filter, thus, non-filtered lubricant may not re-enter the lubrication cycle.

According to a general embodiment, the pressurizing device is configured such, that that a relative pressure of provided gas with regard to an environment pressure and/or with regard to an existing pressure in the filter volume does not exceed 4 bar, in particular does not exceed 2.5 bar, preferably does not exceed 2 bar. Specifically, the pressurizing device may comprise pressure reduction means, for example a pressure reduction valve, for reducing pressure of a gas provided by the supply means to aforementioned values.

According to an additional or alternative aspect, a gearbox system for a wind turbine is provided, the gearbox system including at least a gearbox having a gearbox volume, and a lubrication cycle for providing a circulating flow of lubricant to lubrication locations of the gearbox. The lubrication cycle may comprise a filter system according to one or a combination of the previously disclosed embodiments of a filter system, a pump for transporting and/or pressurizing lubricant in the lubrication cycle, and connection duct means including the upstream duct, the downstream duct and possible further connective ducts.

Generally, the lubrication cycle according to the described embodiment, but not limited to it, may also comprise parts of the gearbox volume, specifically an oil sump of the gearbox. The oil sump is connected to, for example, a cooling device and/or to a reservoir via connective ducts. Further on, lubricant may enter a pump which transports and/or pressurizes it towards the inlet port of the filter device. From there lubricant runs through the oil filter via the inlet port, outlet port, via the check valve into the downstream duct. The downstream duct is connected to specific lubricant guiding channels of the gearbox, wherein said channels enable pressurized lubricant being provided directly to lubrication locations such as bearings or teeth of the gears. When having lubricated these lubrication locations the lubricant is collected in the oil sump of the gearbox and repeats its cycle.

According to an embodiment of the gearbox system the compensation duct connects a pressure port of the filter housing with the gearbox volume, wherein the compensation duct is detachably mounted to the pressure port and/or to the gearbox volume. Thus, if the pressurizing device is to be connected to the filter device, preferably the compensation duct is disconnected from the gearbox volume and subsequently connected to the interface port of the pressurizing device.

In the alternative, the compensation duct can be disconnected from the pressure port, wherein the interface port is connected either directly or by an additional connecting duct to the pressure port.

According to an aspect of the present disclosure, a method for exchanging an oil filter of a gearbox system is described. The gearbox system may be embodied according to one or to a plurality of the precedingly described embodiments, in particular lowering the gearbox system comprises a filter system according to one or a plurality of the aforementioned embodiments of the filter system. The method includes the following steps, wherein it should be understood that the method may further include any of the additional steps and/or features as described herein:

The pressurizing device is connected to the pressure port. If the pressurizing device is integrally formed by the filter device, the step of connecting the pressurizing device materializes by the fact that the interface port of the pressurizing device is constantly connected to the pressure port of the filter device, and/or that the interface port and the pressure port are functionally merged with each other.

If applicable, prior to conducting step of connecting the pressurizing device to the pressure port, the compensation duct may be disconnected from the pressure port and/or from the gearbox volume in order to allow the pressurizing device to be connected to the pressure port.

Subsequent to the step of connecting the pressurizing device pressurized gas is applied into the filter volume, in particular into the inlet volume. By this, lubricant within the filter volume is discharged via the outlet port. In particular, the pressure can be adjusted such that a pressure in the inlet volume does not exceed a pressure in the outlet volume of the filter volume by 4 bar, in particular not exceed by 2.5 bar, preferably does not exceed by 2 bar. By limiting the pressure, it is insured that a bypass valve in the oil filter is not opened by the pressure gradient.

Preferably, in the course of conducting a preparation step, the pump of the lubrication cycle is securely deactivated before the step of applying pressurized gas into the filter volume is conducted, and in particular after having terminated energy generation operation of the wind turbine.

The aforementioned step of providing pressurized gas results in replacing lubricant within the filter volume by the pressurized gas from the pressurizing device, wherein the lubricant is discharged into the downstream duct via the outlet port. The check valve prevents lubricant from re-entering the outlet volume. Furthermore, lubricant in the filter volume cannot be discharged via the inlet duct since the upstream restriction device, for example the oil pump, effectively blocks the passage.

In particular, but not limiting to, the provision of pressurized gas may be terminated, in particular when a level of lubricant within the filter volume falls below a predefined threshold.

After having emptied the filter volume from lubricant during the application of pressurized gas, the cap portion may be removed from the volume portion of the filter housing.

By applying a further optional step, the pressure within the filter volume maybe equalized with an environmental pressure outside the filter volume, in particular before removing the cap portion. By this maintenance staff are protected from being harmed, for example by an "exploding" cap portion.

Now the filter housing is open and the filter volume is accessible. Therefore, the oil filter can be exchanged by removing the current oil filter and by inserting a new oil filter or a cleaned oil filter.

In a final step, before re-activating the pump and subsequently resuming an operation of the wind turbine, the cap portion is to be reassembled to the volume portion.

When applying a method according to one of the preceding embodiments or according to a combination thereof a filter system and/or of a gearbox system, the process of exchanging an oil filter is drastically improved. Consequently, when not applying the present disclosure, lubricant within the filter device is subjected to be spilled into an external receptacle which subsequently had to be carried all the way down from the nacelle to the ground of the wind turbine. This caused a tremendous time delay in exchanging the oil filter, a high risk of hazard for maintenance staff and a loss of lubricant. All this disadvantages are nullified by the described disclosure. The filter device is cleared from lubricant by discharging it using external pressure. When the exchange of the oil filter is completed, lubricant re-enters the filter device from the remaining lubrication cycle, in particular when the pump is re-activated.

In another aspect, the present disclosure is directed to a wind turbine having a nacelle mounted atop a tower, wherein a gearbox system according to one or a plurality of the preceding embodiments is mounted to a support structure or main frame of the nacelle for transforming a low-speed rotational movement having a high-torque from a rotor of the wind turbine into a relatively high speed rotation with a relatively reduced torque. The application of said gearbox system in a wind turbine enables the benefit of reducing downtime of the wind turbine and increasing energy production.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Single features depicted in the figures are shown relatively with regards to each other and therefore are not necessarily to scale. Similar or same elements in the figures, even if displayed in different embodiments, are represented with the same reference numbers.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
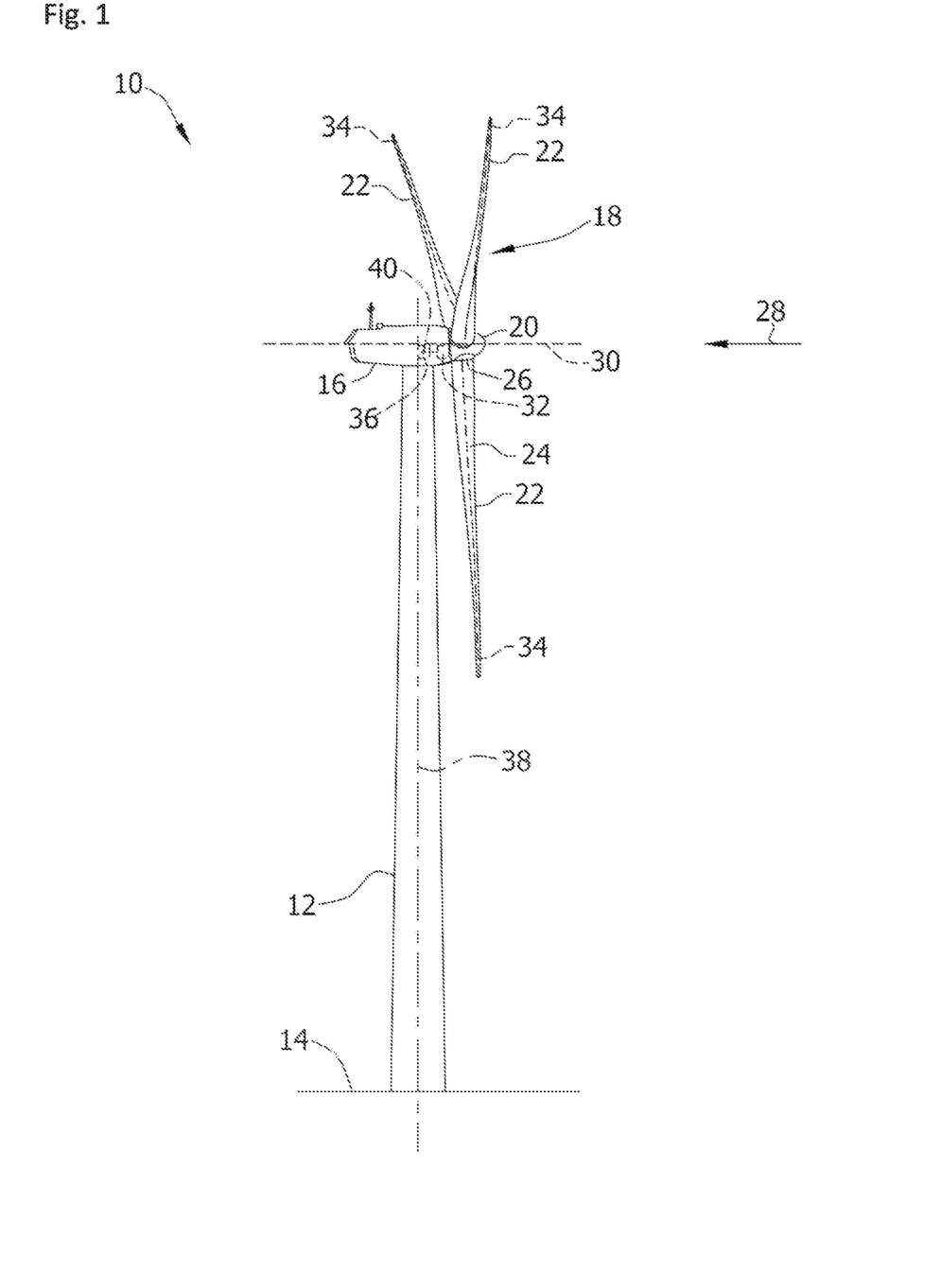
FIG. 1 illustrates a perspective view of one embodiment of a wind turbine according to the present disclosure.

FIG. 1 is a perspective view of an exemplary wind turbine 10. In the exemplary embodiment, the wind turbine 10 is a horizontal-axis wind turbine. Alternatively, the wind turbine 10 may be a vertical-axis wind turbine. In the exemplary embodiment, the wind turbine 10 includes a tower 12 that extends from a support system 14, a nacelle 16 mounted on tower 12, and a rotor 18 that is coupled to nacelle 16. The rotor 18 includes a rotatable hub 20 and at least one rotor blade 22 coupled to and extending outward from the hub 20. In the exemplary embodiment, the rotor 18 has three rotor blades 22. In an alternative embodiment, the rotor 18 includes more or less than three rotor blades 22. In the exemplary embodiment, the tower 12 is fabricated from tubular steel to define a cavity (not shown in FIG. 1) between a support system 14 and the nacelle 16. In an alternative embodiment, the tower 12 is any suitable type of a tower having any suitable height.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In one embodiment, the rotor blades 22 have a length ranging from about 15 meters (m) to about 91 m. Alternatively, rotor blades 22 may have any suitable length that enables the wind turbine 10 to function as described herein. For example, other non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about an axis of rotation 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines a perspective of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may change a pitch angle of the rotor blades 22 such that the rotor blades 22 are moved to a feathered position, such that the perspective of at least one rotor blade 22 relative to wind vectors provides a minimal surface area of the rotor blade 22 to be oriented towards the wind vectors, which facilitates reducing a rotational speed and/or facilitates a stall of the rotor 18.

In the exemplary embodiment, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the exemplary embodiment, as the wind direction 28 changes, a yaw direction of the nacelle 16 may be rotated about a yaw axis 38 to position the rotor blades 22 with respect to wind direction 28.

In the exemplary embodiment, the wind turbine controller 36 is shown as being centralized within the nacelle 16, however, the wind turbine controller 36 may be a distributed system throughout the wind turbine 10, on the support system 14, within a wind farm, and/or at a remote control center. The wind turbine controller 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

Figure 2:
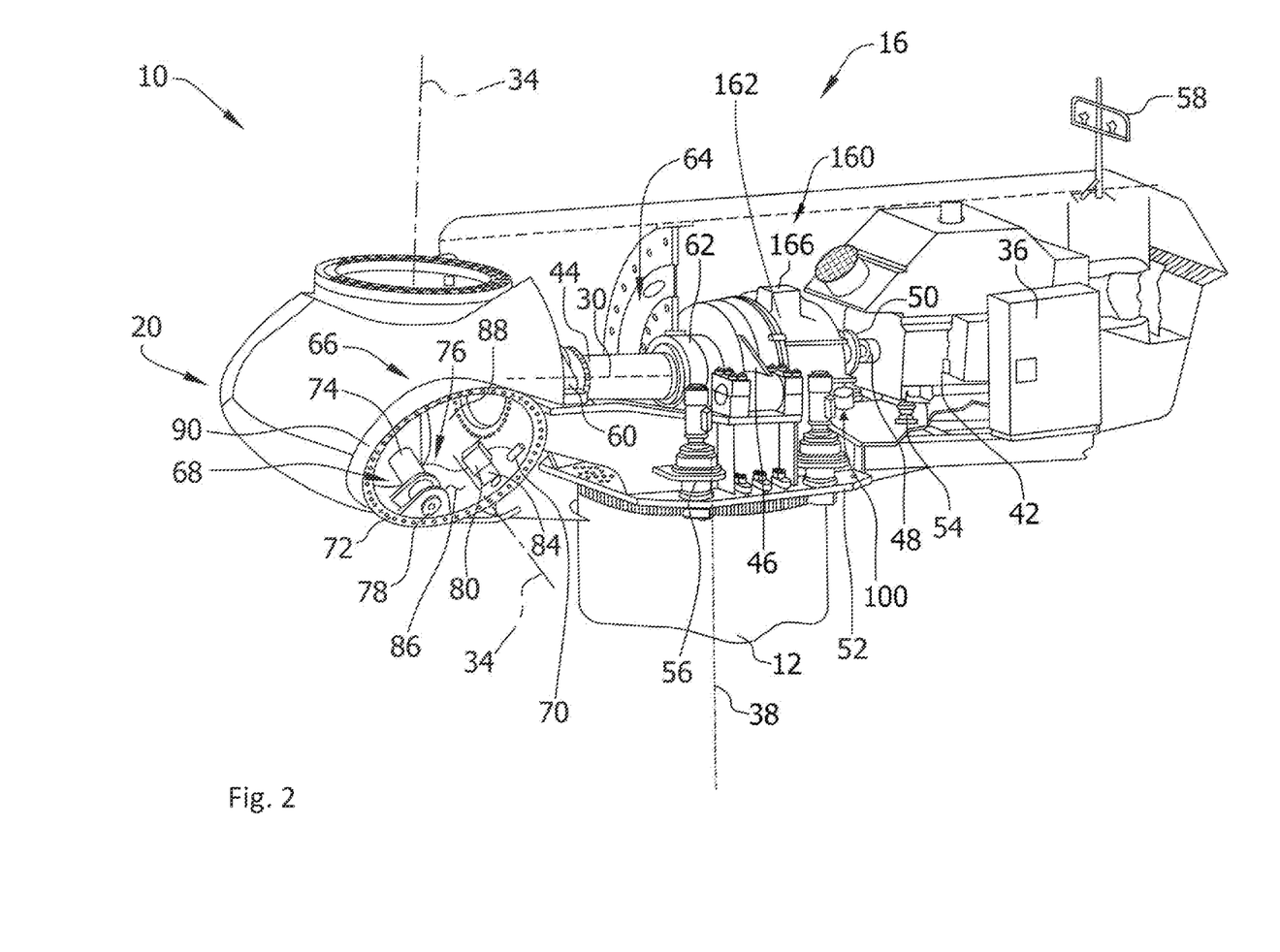
FIG. 2 illustrates a simplified, internal view of one embodiment of a nacelle of a wind turbine according to the present disclosure having an embodiment of a filter system.

FIG. 2 is an enlarged sectional view of a portion of the wind turbine 10. In the exemplary embodiment, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 166, a high speed shaft 48, and a coupling 50. In the exemplary embodiment, the main shaft 44 is disposed at least partially coaxial to a longitudinal axis (not shown) of the nacelle 16. A rotation of the main shaft 44 drives the gearbox 166 that subsequently drives the high speed shaft 48 by translating the relatively slow rotational movement of the rotor 18 and of the main shaft 44 into a relatively fast rotational movement of the high speed shaft 48. The latter is connected to the generator 42 for generating electrical energy with the help of a coupling 50.

Figure 3:
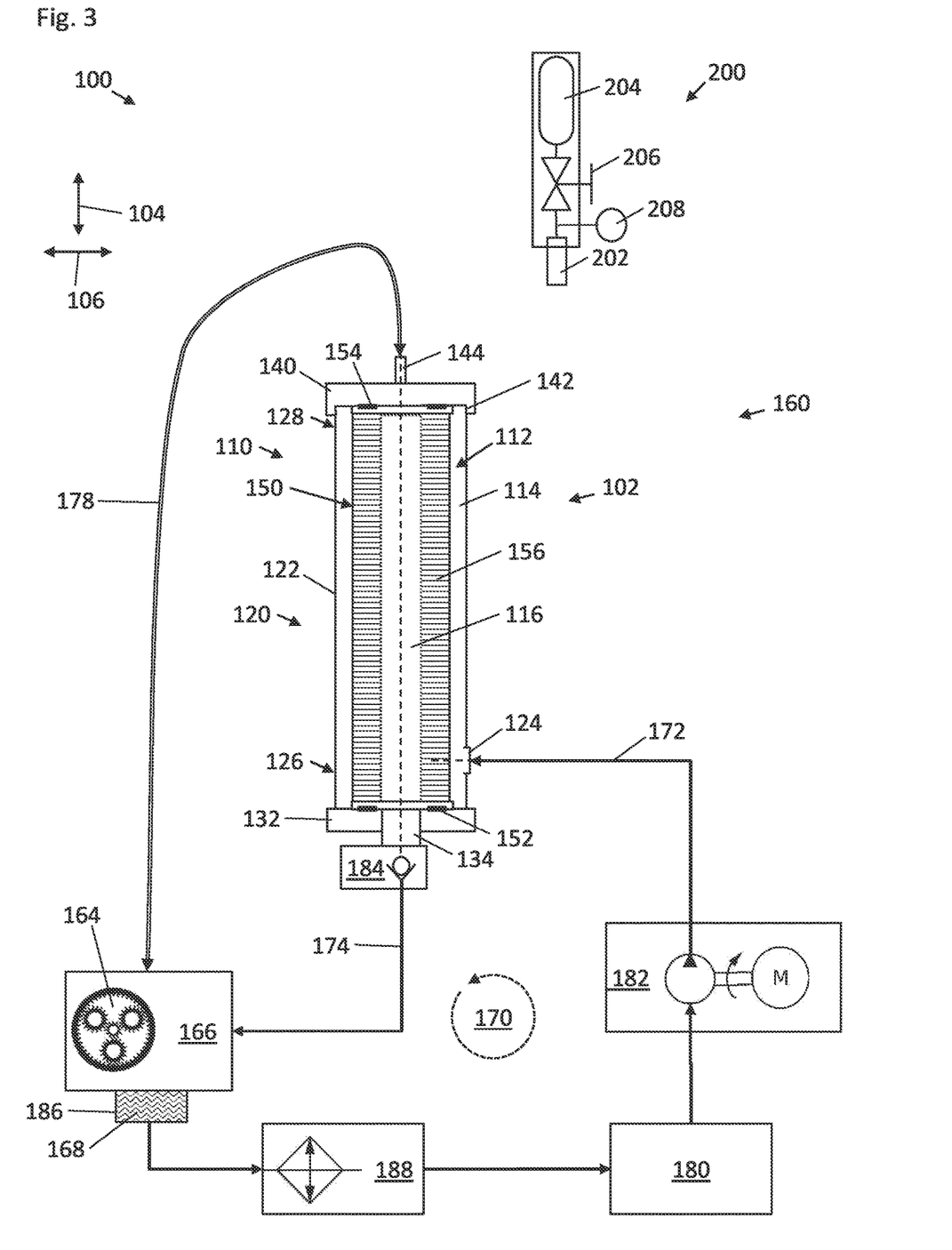
FIG. 3 is a schematic representation of the filter system according to FIG. 2.

The gearbox 166 is part of a gearbox system 160 comprising at least the gearbox 166 and a lubrication cycle 170 as shown in FIG. 3. The lubrication cycle 170 provides lubricant 168 to lubrication locations, such as bearings and teeth of gears, of the gearbox 166. Subsequently, the lubricant 168 is collected in the gearbox 166, in particular in an oil sump 186 of the gear box 166, then, pressurized by a pump 182, filtered by a filter device 102 and repeatedly provided to the lubrication locations. Additionally, thermal energy generated by and/or present in the gearbox 166 can be transported by the lubrication cycle 170 to a cooling device 188 being arranged downstream of the gearbox 166.

The gearbox system 160 and generator 42 may be supported by a main support structure frame of the nacelle 16, optionally embodied as a main frame 52. The gearbox 166 may include a gearbox housing 162 that is connected to the main frame 52 by one or more torque arms 103. In the exemplary embodiment, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Preferably, the main frame 52 is configured to carry the entire load caused by the weight of the rotor 18 and components of the nacelle 16 and by the wind and rotational loads, and furthermore, to introduce these loads into the tower 12 of the wind turbine 10. The rotor shaft 44, generator 42, gearbox 166, high speed shaft 48, coupling 50, and any associated fastening, support, and/or securing device including, but not limited to, support 52, and forward support bearing 60 and aft support bearing 62, are sometimes referred to as a drive train 64.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle appropriately with respect to the wind direction 28, the nacelle 16 may also include at least one meteorological mast 58 that may include a wind vane and anemometer (neither shown in FIG. 2). The mast 58 provides information to the wind turbine controller 36 that may include wind direction and/or wind speed.

In the exemplary embodiment, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angel of a rotor blade 22 along the pitch axis 34. Only one of three pitch drive systems 68 is shown in FIG. 2.

In the exemplary embodiment, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the exemplary embodiment, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servo-mechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 also includes one or more pitch control systems 80 for controlling the pitch drive system 68 according to control signals from the wind turbine controller 36, in case of specific prioritized situations and/or during rotor 18 overspeed. In the exemplary embodiment, the pitch assembly 66 includes at least one pitch control system 80 communicatively coupled to a respective pitch drive system 68 for controlling pitch drive system 68 independently from the wind turbine controller 36. In the exemplary embodiment, the pitch control system 80 is coupled to the pitch drive system 68 and to a sensor 70. During normal operation of the wind turbine 10, the wind turbine controller 36 controls the pitch drive system 68 to adjust a pitch angle of rotor blades 22.

In one embodiment, in particular when the rotor 18 operates at rotor overspeed, the pitch control system 80 overrides the wind turbine controller 36, such that the wind turbine controller 36 no longer controls the pitch control system 80 and the pitch drive system 68. Thus, the pitch control system 80 is able to make the pitch drive system 68 to move the rotor blade 22 to a feathered position for reducing a rotational speed of the rotor 18.

According to an embodiment, a power generator 84, for example comprising a battery and/or electric capacitors, is arranged at or within the hub 20 and is coupled to the sensor 70, the pitch control system 80, and to the pitch drive system 68 to provide a source of power to these components. In the exemplary embodiment, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the exemplary embodiment, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface 90 of hub 20 and may be coupled, directly or indirectly, to outer surface 90.

FIG. 3 is a schematic representation of an embodiment of a filter system 100 for the gearbox system 160 of the wind turbine 10. Specifically, the lubrication cycle 170 is schematically depicted, wherein the lubrication cycle 170 enables a cyclical flow of lubricant 168 from a reservoir 180 to a pump 182, which pressurizes and transports the lubricant 168 through an upstream duct 172 towards an inlet port 124 of a filter device 102 of a filter system 100. After being filtered by an oil filter 150 of the filter device 102 lubricant 168 enters a downstream duct 174 passing an outlet port 134 and a check valve 184. The downstream duct 174 connects the filter system 100 with the gearbox 166 having a gearbox volume 164 within the gearbox housing 162. In particular, the downstream duct 174 is connected to non-shown guiding channels in the gearbox housing 162, which connect the downstream duct 174 with the lubrication locations. After having lubricated the lubrication locations the lubricant 168 is collected in the gearbox 166, for example at the bottom of the gearbox volume 164, in particular in the oil sump 168. Further on, lubricant flows through the cooling device 188 before re-entering the reservoir 180.

The filter device 102 is configured for receiving the oil filter 150 in a filter volume 112 of the filter housing 110, wherein the filter housing 110 may be structured into a volume portion 120 and a cap portion 140. The cap portion 140 can be mounted onto the volume portion 120 such that the filter volume 112 is tightly sealed with respect to the environment. However, the filter volume 112 is connected to the upstream duct 172 via the inlet port 124, to the downstream duct 174 via the outlet port 134, and optionally to the gearbox volume 164 via a pressure port 144.

The volume portion 120 consists at least of an encompassing part 122, preferably having a cylindrical form, and of a bottom part 132, wherein the bottom part 132 is connected to a bottom side 126 of the encompassing part 120.

According to this specific example, however, but not limited to, the outlet port 134 is arranged in the bottom part 132. Furthermore, the check valve 184 can be arranged directly to the outlet port 134 and/or to the bottom part 132, and/or the check valve 184 may be integrated into the bottom part 132.

The cap portion 140 may comprise the pressure port 144 and can be mounted to a top side 128 of the volume portion 120 in a sealing manner, for example by screwing the cap portion 140 onto a thread 142 of the volume portion 120.

The downstream duct 174 connects the gearbox 166 with the outlet port 134 and/or with the check valve 184, wherein the upstream duct 172 provides a direct connection from the pump 182 to the filter volume 112. According to this specific embodiment, the gearbox 166 comprises the oil sump 186, the cooling device 188 is arranged downstream of the gearbox 166 and upstream of the reservoir 180, and the pump 182 is placed downstream of the reservoir 180 and upstream of the filter device 102 and gearbox 166.

Nevertheless, and according to an embodiment, the present disclosure explicitly includes lubrication cycles having a different configuration, for example a lubrication cycle having a cooling device located downstream of the pump 182, or, wherein the gearbox would not comprise an oil sump 186, and/or, wherein the reservoir is not provided at all or located at a different position within the lubrication cycle.

During normal operation of the wind turbine 10, hence, the wind turbine 10 is generating energy or at least its rotor 18 is rotating, the cap portion 140 is firmly mounted to the volume portion 120, and the oil filter 150 is arranged in the filter volume 112 of the filter housing 110. By this, the oil filter 150 divides the filter volume 112 into an inlet volume 114 being connected to the inlet port 124 and into an outlet volume 116 being connected to the outlet port 134. For this purpose, bottom ceiling means 152 and top sealing means 154 are provided in order to create a sealed connection between a bottom surface of the oil filter 150 and an inner bottom surface of the bottom part 132, and to create a sealed connection between a top surface of the oil filter 150 and an inner cap surface of the cap portion 140. These sealing connections between the oil filter 150 and the bottom part 132 and the cap portion 140 prevent lubricant from bypassing the oil filter 150 directly from the inlet volume 114 to the outlet volume 116.

In addition, during normal operation, the pressure port 144 is connected to the gearbox volume 164 using a compensation duct 178.

According to an embodiment, the pressure port 144 is arranged such in the cap portion 140 that the pressure port 144 is connected to the inlet volume 114. Hence, air possibly being transported from the pump 182 into the inlet volume 114 may escape the filter device 102 and bypass the oil filter 150 directly into the gearbox volume 164. Preferably, the connection between the filter volume 112 and the gearbox volume 164, for example the compensation duct 178, the pressure port 144 and/or a pressure port arranged at the gearbox volume 164 a/or are embodied such, that lubricant 168 is effectively prevented from passing through said connection, in particular from the filter volume 112 into the gearbox volume 164, wherein a gaseous fluid, for example air, may pass. By this, it is ensured that lubrication locations are constantly provided with lubricant 168 and that a gaseous fluid such as air may not reach said lubrication locations possibly resulting in an ineffective lubrication and possible harm.

In addition, the filter system 100 comprises a pressurizing device 200 which can be connected to the filter volume 112 via the pressure port 144 and via an interface port 202 of the pressure rising device 200. The pressurizing device 200 at least comprises gas supply means, in this example a gas cartridge 204, and may further comprise a pressure adjustment valve 206 and/or a pressure meter 208.

According to the embodiment of FIG. 3 to FIG. 8, the pressurizing device 200 maybe embodied as a separate device which may be brought in connection with the filter device 102 if the oil filter 150 needs to be replaced.

According to an additional and/or an alternative embodiment (not shown), a pressurizing device may either be firmly connected to the filter device or maybe even an integral component of the filter device.

FIG. 4 to FIG. 8 depict various steps of a method for exchanging the oil filter 150 of the filter system 100, wherein the disclosure is not limited to the entirety of presented steps, but also a selection of steps may sufficiently serve the purpose of the present disclosure.

Figure 4:
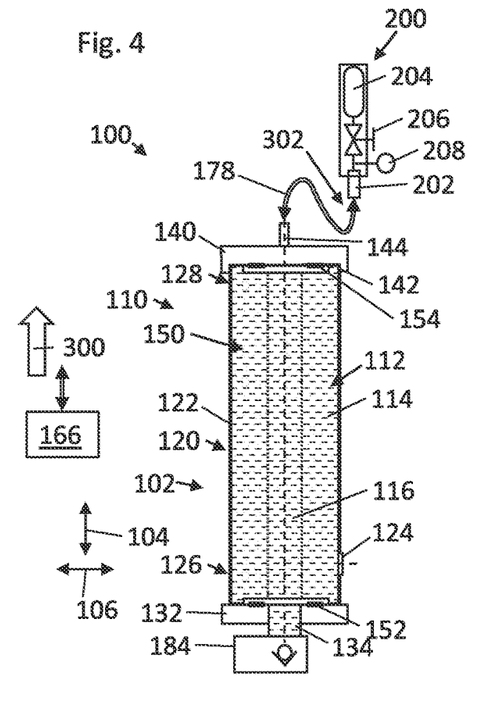
FIG. 4 illustrates steps of a method for exchanging an oil filter of the filter system according to FIG. 2.

FIG. 4 shows the filter system 100, wherein according to an optional step 300 the compensation duct 178 is disconnected from the gearbox 166.

Prior to this, an optional step of terminating the wind turbine's operation and/or an optional step of securely deactivating the pump 182 may be conducted. In particular, the secure deactivation of the pump 182 results in that the pump 182 cannot be activated via further controller or control unit such as the wind turbine controller 36.

According to another step 302, the pressurizing device 200 is connected to the pressure port 144, in particular using the compensation duct 178, for example, its end which earlier was connected to the gearbox 166.

According to the embodiment of a pressurizing device integrated into the filter device, step 302 of connecting a pressurizing device with a pressure port is conducted permanently, specifically by the integrated design, even though if there are valve means being provided between supply means of the pressurizing device and the filter volume.

Figure 5:
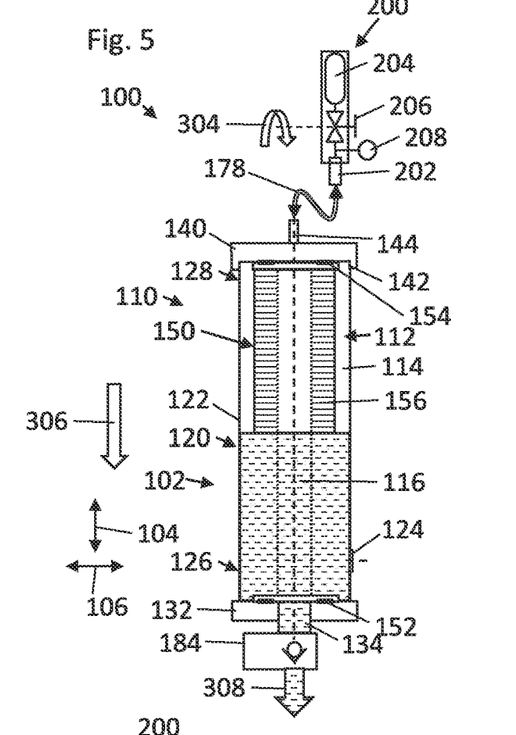
FIG. 5 illustrates further steps of the method for exchanging an oil filter of the filter system according to FIG. 2.

After having established a connection between the pressurizing device 200 and the filter device 102, a step 304 of applying pressurized gas into the filter volume 112, in particular into the inlet volume 114 for discharging 308 the lubricant 168 as shown in FIG. 5. This can be executed by opening the pressure adjustment valve 206 of the pressurizing device 200. In fact, lubricant 168 being present in the inlet volume 114 and in the outlet volume 116 is forced to leave the filter volume 112 through the outlet port 134 and check valve 184.

Figure 6:
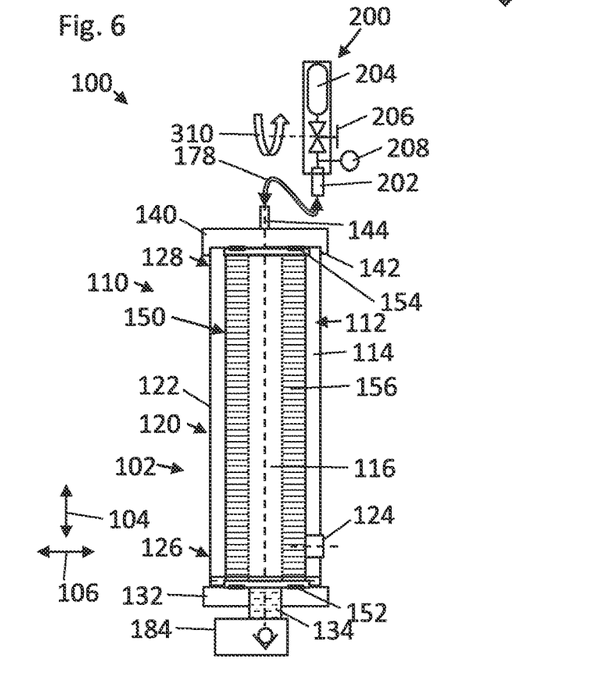
FIG. 6 illustrates further steps of the method for exchanging an oil filter of the filter system according to FIG. 2.

As long as a pressure within the filter volume 112—caused by the pressurizing device 200—is larger than a pressure in the downstream duct 174, the lubricant level is reduced 306. When a level of the lubricant 168 in the filter volume 112 is below a predefined threshold, the application of pressurized gas is terminated 310, for example by closing the pressure adjustment valve 206. Preferably, the termination 310 is conducted when essentially all of the lubricant 168—for example more than 90 percent of the filter volume 112—has been discharged 308 as shown in FIG. 6.

Figures 7, 8:
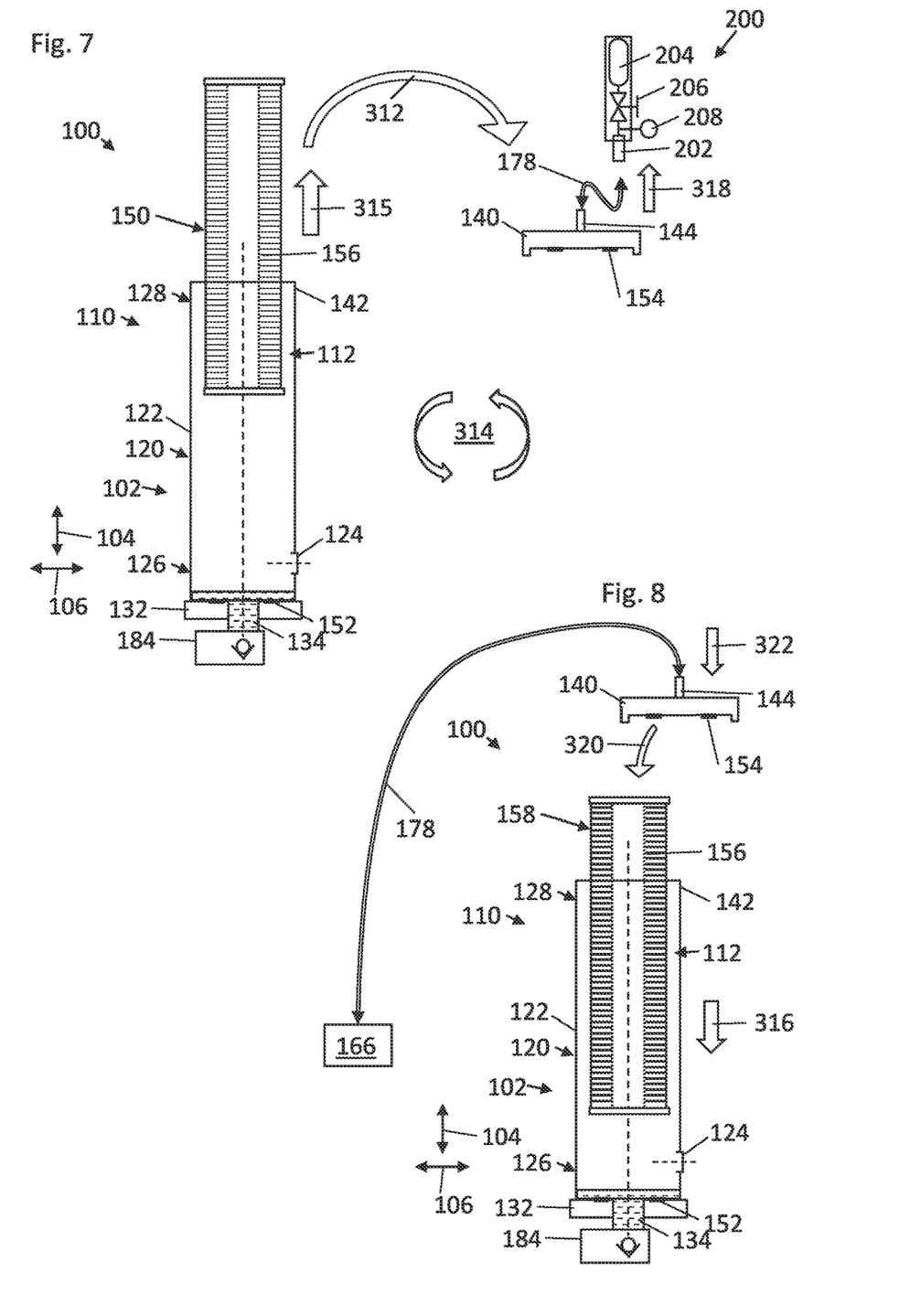
FIG. 7 illustrates further steps of the method for exchanging an oil filter of the filter system according to FIG. 2.
FIG. 8 illustrates further steps of the method for exchanging an oil filter of the filter system according to FIG. 2.

As depicted in FIG. 7 the cap portion 140 is removed by a step 312, preferably, wherein prior to step 312 a step of equalizing a pressure within the filter volume 112 and a pressure of the environment is conducted, for example, by releasing surplus pressure from the filter volume 112. This measure increases safety for maintenance staff.

Now, the oil filter 150 is to be replaced 314 by removing 315 it from the filter volume 112 and by replacing it 316 by a new oil filter 158 or cleaned oil filter 150 (see FIGS. 7 and 8).

Having the replaced oil filter 158 arranged in the filter volume 112, the cap portion 140 can be reassembled to the volume portion 120. Optionally, earliest after having terminated 310 the gas application, the pressurizing device 200—if suitable—can be disconnected 318 from the filter device 102. In particular, if the pressurizing device 200 was connected to the pressurizing port 144 using the compensation duct 178, said compensation duct 178 can be reconnected to the gearbox 166.

Finally, the secure deactivation of the oil pump 182 can be disengaged, and operation of the wind turbine 10 can be taken up.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art, for example the embodiment is closing an integrated pressurizing device in the filter device 102. Such other examples are intended to be within the scope of the claims if they include elements that do not differ from the literal language of the claims, or if they include equivalent structural elements with insubstantial differences from the literal languages of the claims.

The present invention is not limited to the above-described embodiments and modifications and may be embodied in various forms within the gist thereof, for example, the technical features of the embodiments and modifications corresponding to the technical features according to the aspects described in the Summary of the Invention section may be replaced or combined as appropriate to solve some or all of the above-described problems or obtain some or all of the above-described effects, for example, the step of pressure equalization may be integrated in the step 310 of terminating gas application into the filter volume 112. According to a further example, the present disclosure is not limited to a wind turbine comprising such a gearbox system, but also on apparatus and machines having a gearbox system, for example a gearbox of an ocean vessel.

The technical features may also be omitted as appropriate unless they are described as being essential in this specification.

| REFERENCE NUMBERS | |
|---|---|
| 10 | wind turbine |
| 12 | tower |
| 14 | support system |
| 16 | nacelle |
| 18 | rotor |
| 20 | rotatable hub |
| 22 | rotor blades |
| 24 | blade root portion |
| 26 | load transfer regions |
| 28 | wind direction |
| 30 | axis of rotation |
| 32 | pitch system |
| 34 | pitch axes |
| 36 | wind turbine controller |
| 38 | yaw axis |
| 40 | processor |
| 42 | electric generator |
| 44 | main shaft |
| 46 | torque arm |
| 48 | high speed shaft |
| 50 | coupling |
| 52 | Main frame |
| 54 | Decoupling support means |
| 56 | yaw drive mechanism |
| 58 | meteorological mast |
| 60 | forward support bearing |
| 62 | aft support bearing |
| 64 | drive train |
| 66 | pitch assembly |
| 68 | pitch drive system |
| 70 | sensor |
| 72 | pitch bearing |
| 74 | pitch drive motor |
| 76 | pitch drive gearbox |
| 78 | pitch drive pinion |
| 80 | pitch control system |
| 84 | power generator |
| 86 | cavity |
| 88 | inner surface |
| 100 | filter system |
| 102 | Filter device |
| 104 | axial direction |
| 106 | radial direction |
| 110 | Filter housing |
| 112 | Filter volume |
| 114 | Inlet volume |
| 116 | Outlet volume |
| 120 | Volume portion |
| 122 | Encompassing part |
| 124 | Inlet port |
| 126 | Bottom side |
| 128 | Top side |
| 132 | Bottom part |
| 134 | Outlet port |
| 140 | Cap portion |
| 142 | Thread |
| 144 | Pressure port |
| 150 | Oil filter |
| 152 | Bottom sealing means |
| 154 | Top sealing means |

-continued

| REFERENCE NUMBERS | |
|---|---|
| 156 | Filter means |
| 158 | New oil filter |
| 160 | Gearbox system |
| 162 | Gearbox housing |
| 164 | Gearbox volume |
| 166 | Gearbox |
| 168 | Lubricant |
| 170 | Lubrication cycle |
| 172 | Upstream duct |
| 174 | Downstream duct |
| 178 | Compensation duct |
| 180 | reservoir |
| 182 | Pump |
| 184 | Check valve |
| 186 | Oil sump |
| 188 | Cooling device |
| 200 | Pressurizing device |
| 202 | Interface port |
| 204 | Gas cylinder |
| 206 | Pressure adjustment valve |
| 208 | Pressure meter |
| 300 | Disconnecting compensation duct |
| 302 | connecting pressurizing device |
| 304 | Applying pressurized gas |
| 306 | Lubricant level is reduced |
| 308 | Discharge of lubricant |
| 310 | terminating pressure application |
| 312 | Removing cap portion |
| 314 | Replacing oil filter |
| 315 | Removing oil filter |
| 316 | Inserting oil filter |
| 318 | Disconnecting pressurizing device |
| 320 | Reassembling cap portion |
| 322 | reconnecting compensation duct |

The invention claimed is:

1. A system, comprising:
a gearbox system in communication with a lubricant filter system to provide a lubrication cycle;
the gearbox system comprising a gearbox having a gearbox volume, wherein the lubrication cycle provides a circulating flow of lubricant to lubrication locations of the gearbox;
the lubricant filter system comprising a filter device that further comprises a filter housing having a volume portion and a cap portion defining a filter volume;
an oil filter received in the filter volume of the filter device;
an inlet port in the filter housing to the filter volume, the inlet port connectable to an upstream duct of the lubrication cycle;
an outlet port in the filter housing from the filter volume connectable to a downstream duct of the lubrication cycle, the downstream duct connecting the outlet port and the gearbox;
a pressure port in the filter housing, the pressure port in communication with the filter volume so that a pressurized gas supplied through the pressure port is introduced into the filter volume; and
a pressurizing device comprising an interface port connectable to the pressure port and a supply means of the pressurized gas that is introduced in the filter volume via the interface port and the pressure port.

2. The system according to claim 1, wherein the pressure port is connectable to the gearbox volume via a compensation duct.

3. The system according to claim 1, wherein the pressurizing device is an integral component of the filter device such that the pressure port and the interface port are functionally merged with each other.

4. The system according to claim 1, comprising a check valve configured with the outlet port to prevent lubricant from flowing from the downstream duct into the filter volume.

5. The system according to claim 1, wherein the gearbox is a component of a wind turbine gearbox system and the filter volume has at least a 5 liter capacity.

6. The system according to claim 1, wherein:
the volume portion comprises a longitudinally extending part with a bottom part connected to a bottom side of the longitudinally extending part;
the outlet port is arranged in the bottom part and the inlet port is arranged in the longitudinally extending part;
the cap portion is mountable in a sealing manner to a top side of the longitudinally extending part opposite to the bottom side; and
the pressure port is arranged in the cap portion.

7. The system according to claim 6, wherein the cap portion is mounted to the volume portion, the filter system further comprising:
a top seal arranged between an upper surface of the oil filter and an inner cap surface of the cap portion;
a bottom seal between a bottom surface of the oil filter and an inner bottom surface of the bottom part; and
wherein the filter volume is divided by the oil filter into an inlet volume and an outlet volume and lubricant streaming from the inlet port through the inlet volume and through the outlet volume into the outlet port is forced to radially flow through the oil filter and is prevented from bypassing the oil filter.

8. The system according to claim 6, wherein the pressure port is connected to the inlet volume and a check valve is connected to the outlet volume.

9. The system according to claim 1, wherein the pressurized gas supplied to the filter volume from the pressurizing device exceeds 4 bar.

10. The system according to claim 1, further comprising:
a pump that pressurizes the lubricant within the lubrication cycle;
ducting including an upstream duct connected to the inlet port and the downstream duct connected to the outlet port to enable the circulating flow of lubricant between the filter device, the gearbox volume, and the pump.

11. The system according claim 10, comprising a compensation duct connecting the pressure port to the gearbox volume, the compensation duct detachably mounted to the pressure port or to the gearbox volume.

12. A wind turbine, comprising:
the system according to claim 1;
a turbine rotor including a hub and at least one rotor blade mounted to a rotatable turbine shaft;
an induction generator having a stator and a rotor; and
wherein the gearbox couples the generator to the turbine shaft for rotation therewith.

* * * * *